United States Patent
Skinner et al.

(10) Patent No.: US 9,989,355 B1
(45) Date of Patent: Jun. 5, 2018

(54) METHOD AND APPARATUS FOR CONDUCTING REAL-TIME PROCESS CONTROL OF PARTICLE AND FIBER GENERATION

(71) Applicants: Jack L. Skinner, Butte, MT (US); Joshua D. Beisel, Butte, MT (US); Marvin J. Franson, Butte, MT (US); Bryce Hill, Butte, MT (US)

(72) Inventors: Jack L. Skinner, Butte, MT (US); Joshua D. Beisel, Butte, MT (US); Marvin J. Franson, Butte, MT (US); Bryce Hill, Butte, MT (US)

(*) Notice: Subject to any disclaimer, the term of this patent is extended or adjusted under 35 U.S.C. 154(b) by 0 days. days.

(21) Appl. No.: 15/212,144

(22) Filed: Jul. 15, 2016

Related U.S. Application Data

(60) Provisional application No. 62/192,909, filed on Jul. 15, 2015.

(51) Int. Cl.
*G01B 11/08* (2006.01)
*D01D 5/00* (2006.01)

(52) U.S. Cl.
CPC .......... *G01B 11/08* (2013.01); *D01D 5/0061* (2013.01)

(58) Field of Classification Search
None
See application file for complete search history.

(56) References Cited

U.S. PATENT DOCUMENTS

| | | | |
|---|---|---|---|
| 8,636,493 B2* | 1/2014 | Reneker | G01N 11/02 425/135 |
| 2009/0020921 A1* | 1/2009 | Cakmak | B29C 39/14 264/484 |
| 2014/0005470 A1* | 1/2014 | Soletti | A61L 27/3625 600/36 |

OTHER PUBLICATIONS

Stephens, J. S., et al. ""Real time" Raman studies of electrospun fibers." Applied Spectroscopy 55.10 (2001): 1287-1290.*
Greenfeld, Israel, et al. "Polymer dynamics in semidilute solution during electrospinning: a simple model and experimental observations." Physical Review E 84.4 (2011): 041806.*
Greenfeld, Israel, et al. "Fast X-ray phase-contrast imaging of electrospinning polymer jets: measurements of radius, velocity, and concentration." Macromolecules 45.8 (2012): 3616-3626.*

* cited by examiner

*Primary Examiner* — Shawn Decenzo
(74) *Attorney, Agent, or Firm* — Haffy Vap PLLC; Mitchell S.W. Vap

(57) ABSTRACT

A linear stage moves a laser along the collection plate of an electrospinning device. The stage supports the laser that is moved through the electrospinning/electrospraying deposition field by a continuous rotation servo motor. Stage movement is controlled by a control unit. Signal voltages collected are sectioned into concentric layers so that the extinction coefficient for each layer can be calculated without including the extinction coefficient from the previous layer. The extinction coefficients were used in the Beer-Lambert law to determine the diameter of fibers being deposited on the collection plate as well as the concentration of fibers deposited indicating deposition speed.

8 Claims, 7 Drawing Sheets

METHOD AND APPARATUS FOR CONDUCTING REAL-TIME PROCESS CONTROL OF PARTICLE AND FIBER GENERATION

CROSS-REFERENCE TO RELATED APPLICATIONS

This application claims the benefits of U.S. Provisional Application No. 62/192,909, filed Jul. 15, 2015, the disclosure of which is hereby incorporated by reference in its entirety including all figures, tables and drawings.

STATEMENT REGARDING FEDERALLY SPONSORED RESEARCH OR DEVELOPMENT

This invention was made with government support under GRANT # W911NF-15-2-0020 awarded by the Army Research Laboratory. The government has certain rights in this invention.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Electrospinning is the process of fabricating fibers on a micro- and nano-scale. Polymer is fed through a very small diameter spinneret, which is connected to a high voltage DC power supply. The electrostatic force generated by the power supply is used to draw the polymer out the end of the spinneret onto a conductive collection plate to create a very small almost spider-web-like material. The fibers created have diameters within the micron to sub-micron scale. While the electrospinning process is well established, it is not currently possible to analyze the fibers in real time as they form. Some of the current methods of fiber analysis post formation include: transmission electron microscopy, scanning electron microscopy, Raman Spectroscopy, and high speed camera; these methods however require either post processing or specialty equipment.

A real-time fiber measurement tool would allow for fiber deposition to be monitored and therefore manipulated on-site, resulting in fiber mats which possess properties consistent with the fabricator's intent. A need remains for such a tool.

All patents, patent applications, provisional patent applications and publications referred to or cited herein, are incorporated by reference in their entirety to the extent they are not inconsistent with the teachings of the specification.

SUMMARY OF THE INVENTION

The invention is a device and method that uses laser extinction to analyze microfiber formation during the electrospinning or electrospraying process. A linear stage moves a laser across the collection plate of an electrospinning apparatus such that the laser is directed through the electrospun fibers during deposition. Laser intensity measurements are manipulated using the Beer-Lambert law to determine the diameter of fibers being formed. This provides the operator real-time analysis and control of fiber dimension as the fibers are being formed.

The laser moves along the linear guide under the control of a control unit. The control unit moves the laser with a stepper motor to provide unrestricted laser movement. The control unit is programmed with process parameters to ensure an adequate collection of data. Data collected is reported to a computer for higher level data computing.

DETAILED DESCRIPTIONS OF THE INVENTION

The invention involves a device and method allowing real-time dimensional analysis of microfibers during the electrospinning process. A linear stage moves a laser across the distance of the conductive collection plate of the electrospinning apparatus such that the laser is directed through the fiber deposition. Laser reading are used to achieve extinction coefficients for each layer. The extinction coefficients are used in the Beer-Lambert law to determine fiber diameter.

Laser extinction is used to measure soot particles in a combustive reaction. Laser extinction is a method which utilizes the Beer-Lambert law and tomography calculations to measure soot-volume fraction during a combustion reaction in real-time. The subject method uses laser extinction and the Beer-Lambert law in association with optical scattering or Rayleigh/Mie scattering to determine fiber deposition concentrations and fiber diameters while monitoring the electrospinning process.

During the electrospinning process high voltages are used to create the electrostatic forces that draw the small diameter fibers from the source. The use of high voltage requires that proper safety is observed while electrospinning. Some electrospinning equipment uses interlocks to remove the high-voltage source when the door on the electrospinner is opened. To gather the required data concerning the scattering of the laser light an isolated instrument is needed to operate within the electrospinner, without disrupting the process. To obtain this data a device has been fabricated that uses a linear stage in combination with a 650 nm wavelength laser, a photodiode, and tunable circuitry that filters the incoming data and reports values to a computer for high level calculations.

Figure 1:
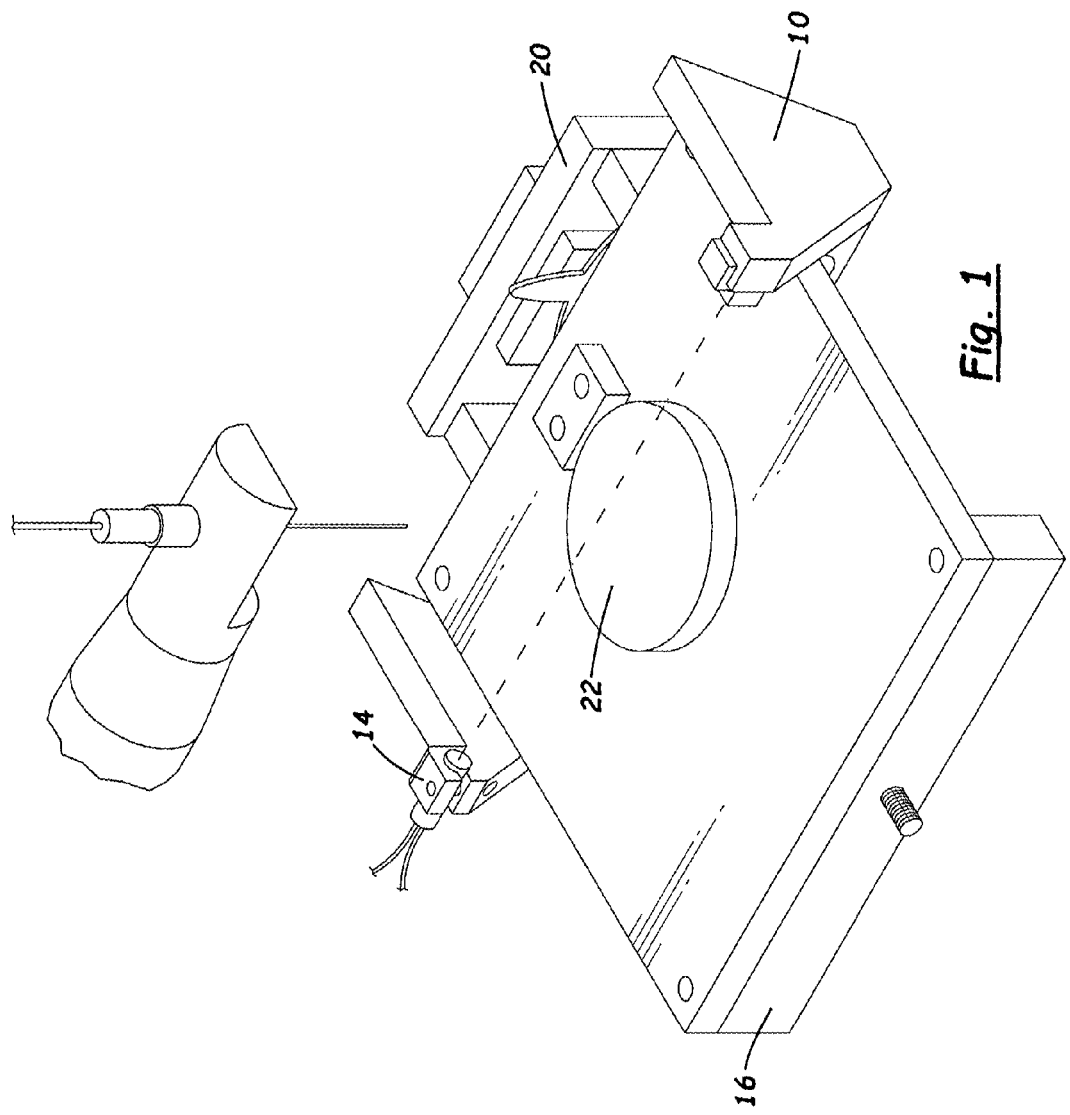
FIG. 1 is a side elevational view of the guide shown in FIG. 1 installed in an electrospinning apparatus.
Figure 2:
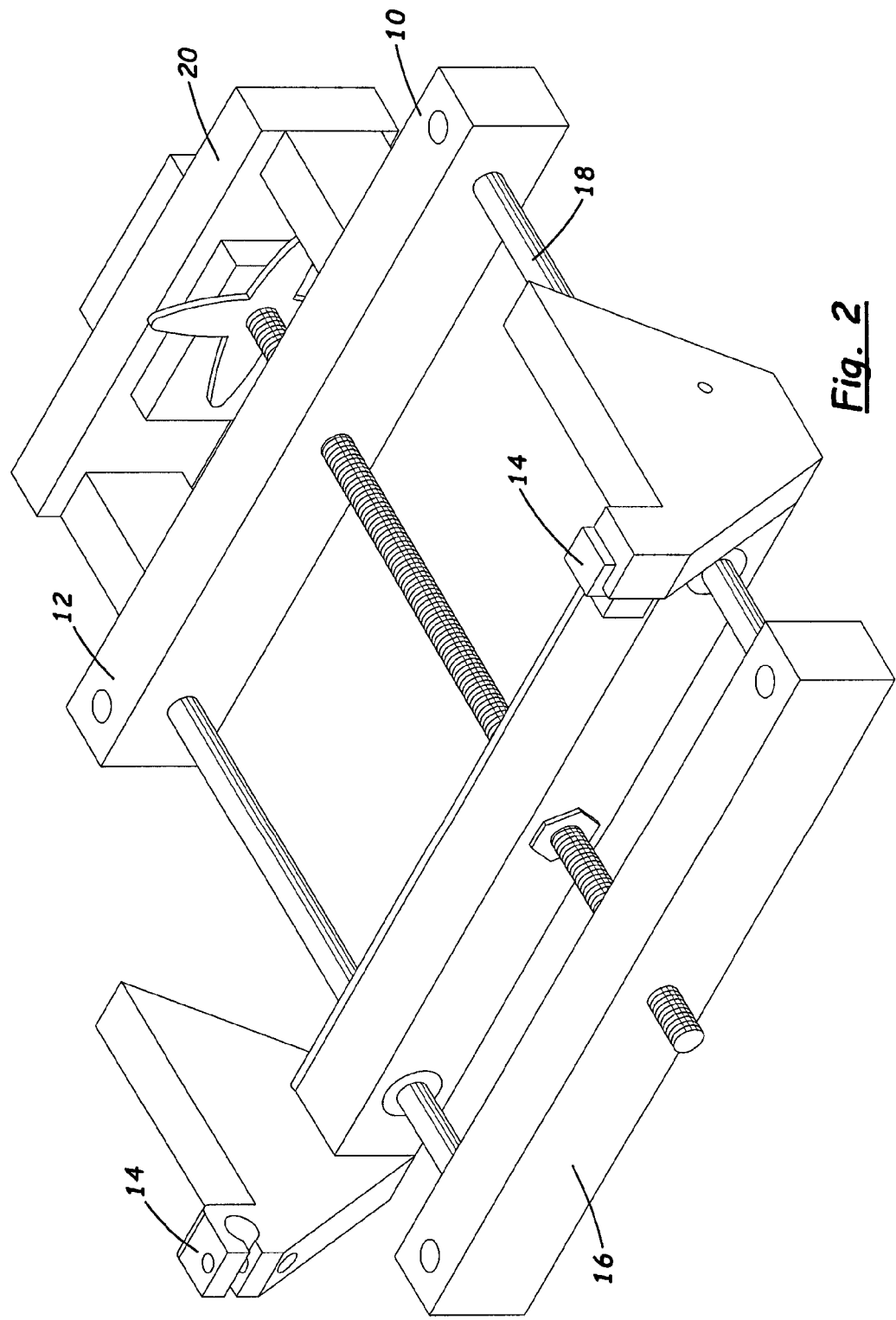
FIG. 2 is an isometric view of a preferred embodiment of a linear guide of the tool of the subject invention.

FIGS. 1 and 2 show a preferred embodiment of the linear stage 10 of the measurement tool of the subject invention. The tool measures light transmission through the electrospinning field of deposition. In the exemplified embodiment, the stage was fabricated using additive manufacturing. Polylactic acid (PLA) polymer was used to provide enough electrical isolation between guide components and the electrostatic field that is necessary for electrospinning. The linear stage 10 has a frame 12 that moves the laser/sensor assembly 14 through the electrospinning/electrospraying deposition field. The frame 12 has ends 16 with rails 18 spaced therebetween. The laser/sensor assembly 14 is moved along the rails 18 of the frame 12 by a stepper motor. This type of motor is preferred to because it offers unlimited, controllable, movement. One skilled in the art however would understand that there are a number of moving means 20 by which to move the laser/sensor assembly through the deposition field. In the exemplified embodiment, limit switches are used for positional location, the laser/sensor assembly stops at the edge of the electrospinner collection plate and scans according to a set of user defined parameters. The tool is powered with a voltage supply that is capable of outputting ±12 V, 5 V, and 3.3 V. Two 15-pin connectors are used to connect the linear stage to the control unit to provide the ability to mount the linear stage within the electrospinner while keeping the control unit outside the electrospinner.

The linear stage is configured to fit within an electrospinning apparatus so it can move the laser/sensor assembly along the electrospinning deposition field between the spinneret 24 and the collection plate 22 (FIG. 1), the stage shown in FIG. 2 was designed to fit under the collection plate 22 within an electro spinner. One skilled in the art would recognize the linear stage of the subject invention could be configured differently than shown in the exemplified embodiment. It is only necessary that the linear stages be configured to move the laser/sensor assembly across the deposition field of the electrospinner in a manner that allows enough data to be collected for the morphological analysis of the forming fibers and in a manner that safely insulates the operator from the high voltages utilized during electrospinning. Likewise, it is noted that although the stage shown in FIG. 2 was fabricated with additive manufacturing, parts can be fabricated by other methods for higher precision. It is further noted that the tool of the subject invention could become an integral component of newly built electrospinners.

In the exemplified embodiment, the signal passes through a trans-impedance amplifier after which voltage is filtered with a tunable active-low-pass filter. Initially the corner frequency of the input signal filter was at 23.9 Hz; however, due to noise in the system, the corner frequency was reduced to approximately 13 Hz. A $25^{th}$ order, digital, median filter and a $5^{th}$ order, digital, moving average filter were incorporated for further noise reduction. By reducing the corner frequency of the input signal filter, the signal noise was reduced. Noise reduction is critical with this procedure since the signal voltages range in the tens of millivolts. The noise is able to be further reduced by obtaining an average voltage per step and through the use of a low noise power supply. While the exemplified embodiment uses the Beer-Lambert equations to process scattering data, it is noted that other computation analysis can be used to process the date and achieve deposition information. These computation analyses include, but are not limited to, processing data using a transfer matrix.

Figure 3:
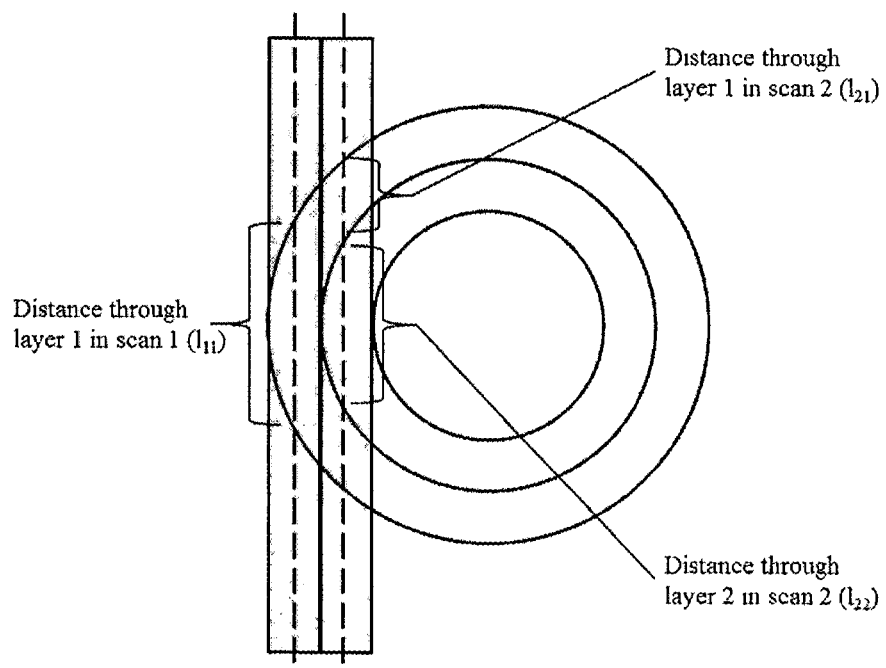
FIG. 3 is a diagram showing the measurements made by the tool of the subject invention.

Movement of the linear stage 10 by the moving means 20 is controlled by a control unit. Preferably, the control unit is programmable. In the exemplified embodiment, programming of the tool prompts the user to input the process parameters; for example, these parameters can include, but are not limited to: step size, measurements collected per step, distance to be scanned, and the file name to save the data to. Based on the user inputs in the exemplified embodiment a microcontroller moves the linear stage, collects signal voltage, and reports the signal voltages to a computer for higher level data computing. One skilled in the art would recognize that a data acquisition system could likewise be used to provide communication between the laser/sensor assembly and the computer. In the exemplified embodiment, the computations require that the sample is sectioned into concentric layers so that the extinction coefficient for each layer can be calculated without including the extinction coefficient from the previous layer, this method is known as the onion peeling method (see FIG. 3). The distance through the measured sample is calculated based on the radius of the sample and the position of the laser. The subject apparatus and method use light scattering to assess the morphology and deposition characteristics of fibers or particles during deposition by electrospinning or electrospraying. While the exemplified embodiment uses laser extinction to process scattering data, it is noted that other computation analysis can be used to process the data and achieve deposition information. Such other computation analyses can include, but are not limited to, processing the data using a transfer matrix.

Multiple data points are used to measure a sample. By scanning an area that is larger than the sample, the initial intensity is able to be calculated, the noise of the measurements is able to be measured, and the signal from the sample is able to be isolated. If the scan does not reveal a voltage deflection that is greater than the value of the noise, then the scan is not considered to be viable. With the repeat scan option all data sets (viable and not viable) are collected and stored.

The tool of the subject invention is capable of quantitative and therefore qualitative dimension analysis and utilizes a linear stage to simultaneously control the motion of a laser (650 nm) and photodiode. The subject tool incorporates tunable circuitry which filters incoming data before transmission to a computer for further mathematical analysis. The collected data is sent to a MATLAB function that completes the onion peeling method. It is noted that the function could also be written for other programs with different programming languages. Based on the first and last deflection points in the data the function calculated the distance through the sample at a given radius and computes the extinction coefficient for each sample layer (see FIG. 3). By differentiating between the different layers of the measured sample, an extinction coefficient is able to be calculated for each layer of the sample. The collected voltages are used in the Beer-Lambert law which is:

$$I = I_0 * e^{-K*l} \quad (1)$$

Where: I is the intensity of the laser beam measured in watts, $I_0$ is the initial intensity of the laser, l is the distance that the laser travels through the sample, and K is extinction coefficient in units of per meter. Since the relationship between voltage and power is proportional (|S|=|V| |I|), the intensity was measured using voltage. Since the onion peel method is used to calculate the extinction coefficient the equation becomes:

$$K_i = \frac{-\ln\left(\frac{I_i}{I_0}\right) + 2*\sum_{n=1}^{i-1}(K_n * l_{i,n})}{l_{i,i}} \quad (2)$$

Where: $K_i$ is the extinction coefficient through the $i^{th}$ layer of the sample and $l_{i,n}$ is distance through the sampled region of deposition (see FIG. 3). The signal output from the sensor is a signal that is filtered to a DC signal, the power factor is assumed to be close enough to unity that the power output is watts. The volume fraction is determined using:

$$\phi = \lambda * \overline{K}/6\pi * E \quad (3)$$

$$E = -I\text{mag}(v^2 - 1/v^2 + 2) \quad (4)$$

Where: $\overline{K}$ is the vector of extinction coefficients that were found using Equation 2, $\lambda$ is the laser wavelength in meters, and v is the index of refraction. For the soot volume fraction verification experiments the index of refraction is assumed to be 1.56-j0.57.

The following examples are offered to further illustrate but not limit both the compositions and the methods of the present invention. All percentages are by weight and all solvent mixture proportions are by volume unless otherwise noted.

Example 1—Soot Volume Fraction Verification

Since soot volume fraction measurement methods utilizing laser scattering and the Beer-Lambert law are used with the tool of the subject invention, a tea-candle was placed within the scanning field to verify its operation. The scanning step size was approximately 2 mm per step, with 15 voltage measurements per step. By reducing the air flow around the candle, the flame was reasonably stabilized for the measurement process.

Figure 4:
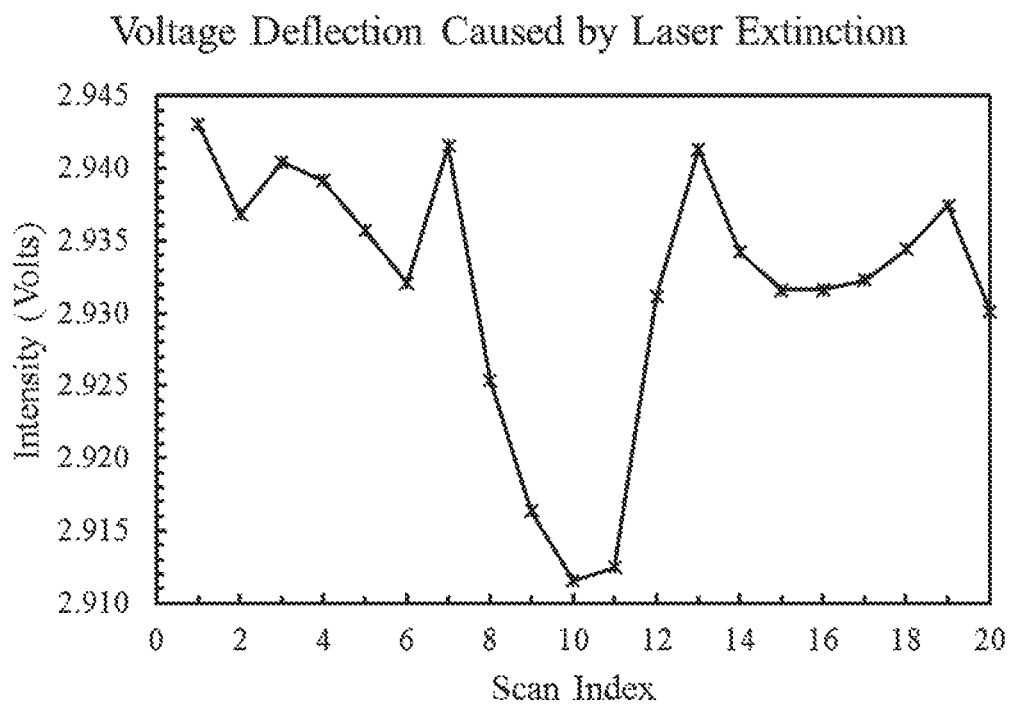
FIG. 4 is a graph showing the measured voltage as the laser scanned through the sample of Example 1.
Figure 5:
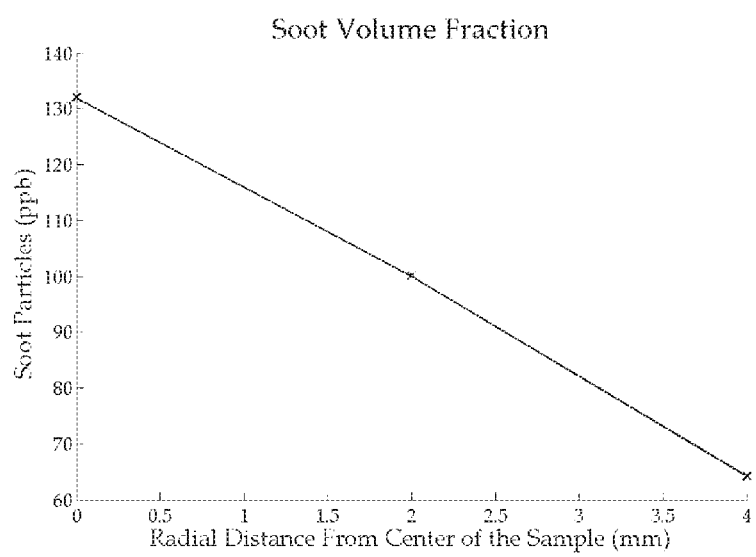
FIG. 5 is a graph showing soot volume fractions calculated in Example 1.

FIG. 4 is the plot of the voltage that was reported from the 10-bit ADC that is contained in the microcontroller. The noise level shown has an approximate magnitude of 7 mV. The magnitude of the signal voltage is approximately 30 mV with an initial deflection point at collection point 7 and a final deflection point at collection point 13. FIG. 5 is a plot of the soot volume fraction as it was calculated using the described methods. The results show that a higher concentration (approximately 132 ppb) of soot particles is measured at the wick of the tea-candle. The soot concentration decreases as the distance from the wick increases, with a final concentration of approximately 64 ppb.

Example 2—Electrospinning Experimentation with Poly(Vinyl Alcohol)

The exemplified embodiment of the tool of the subject invention was installed in the SPRAYBASE® electrospinner to scan through the electrospun fiber deposition field. The SPRAYBASE® was setup to achieve stable electrospinning with a 4 wt % Poly(vinyl alcohol) solution. A needle to collection plate separation distance of 4 cm was used throughout the process. The voltage potential was set to 10.5 kV and 0.027 bar of pressure was applied to the solution for fluid delivery. The laser/sensor assembly was moved through the electrospun fiber deposition field while fibers were being deposited onto a conductive substrate. The tool collected 10 data points through the deposition area. At each data point the tool collected 15 intensity measurements, as measured through the voltage output of the photodiode, and averaged the intensity to reduce the amount of noise that affected the process. The voltages were then compared to tool noise measurements. The noise measurements were collected inside the electrospinner without fibers being deposited.

Figure 6:
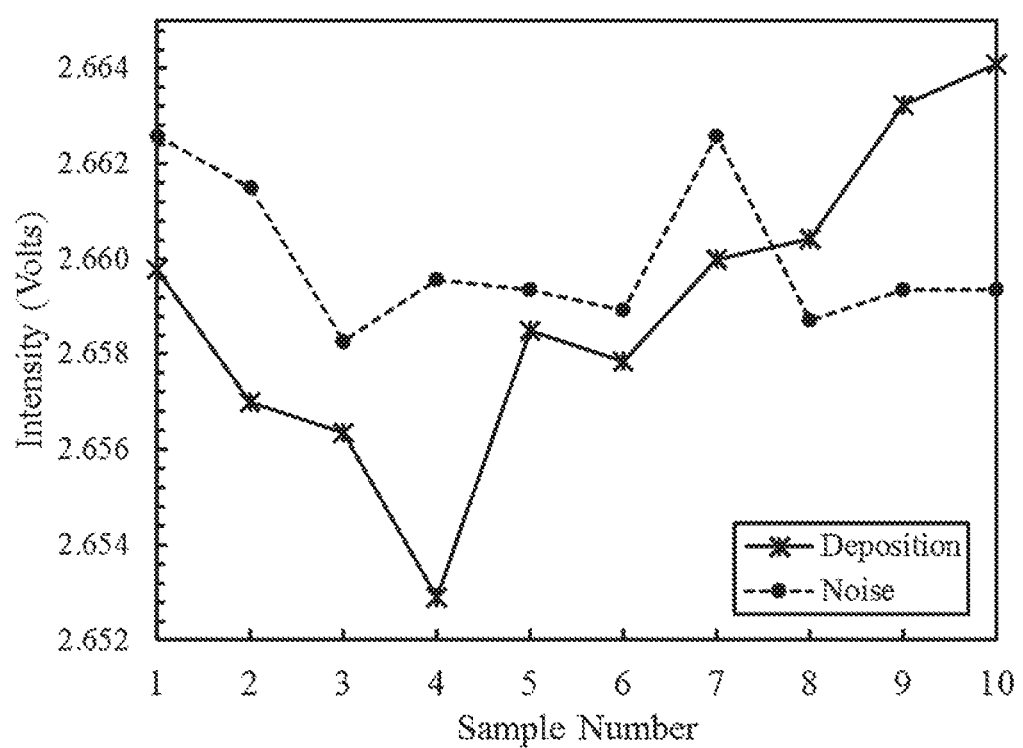
FIG. 6 is a graph showing laser intensity and noise data collected in Example 2.
Figure 7:
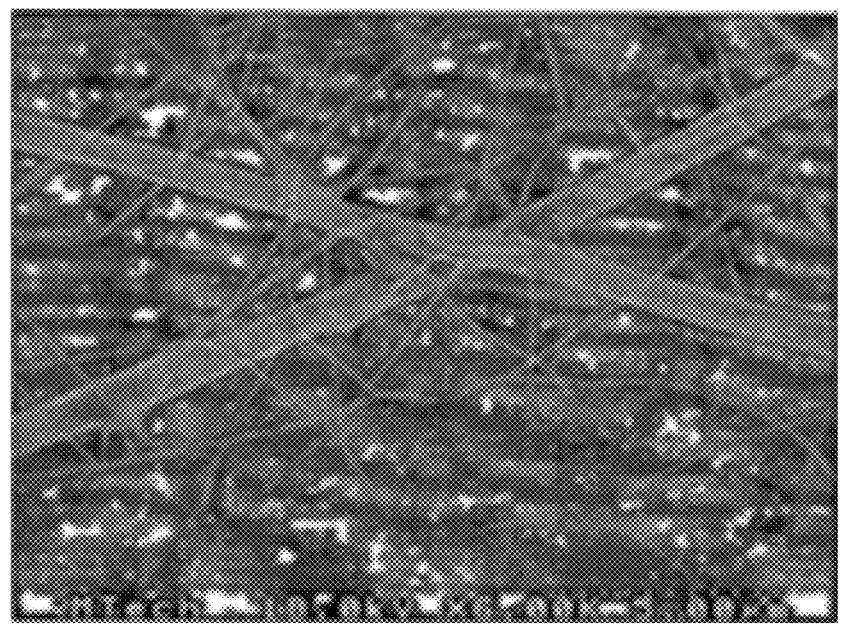
FIG. 7 is a scanning electron micrograph of fibers created in Example 2.

FIG. 6 shows the measured intensity of the laser through the deposition area. The deflection in the measured signal is greater than the noise threshold for the device and is the result of scanning through fibers that are being electrospun. The fibers that were being deposited while the tool was scanning have diameters that range from 125 nm to 823 nm, the average fiber diameter is 296 nm with a standard deviation of 295 nm. (FIG. 7). Specifically, the laser was scanning through the electrospun fibers in points 2-4 with a low sampling rate. The deflection that resulted is greater than the noise threshold for the device (FIG. 6).

Example 3—Electrospinning Experimentation with Poly(Ethylene Oxide)

Figure 8:
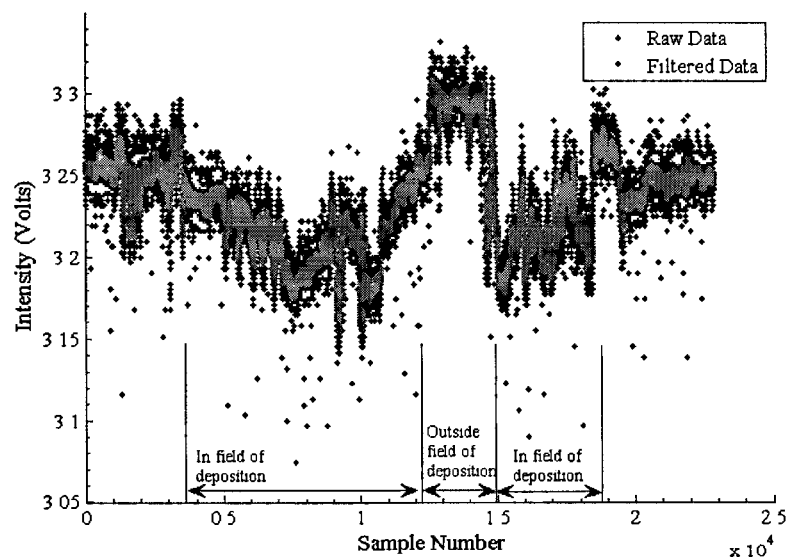
FIG. 8 is a graph showing raw and filtered data collected in Example 3.

Following the example set forth in Example 2; stable electrospinning was achieved with an 8 wt % Poly(ethylene oxide) solution. A needle to collection plate separation distance of 4.5 cm was used with a voltage potential of 6 kV and a flow rate of 0.003 mL/hr through a 20 gauge capillary. The tool collected intensity measurements at a rate of 100 samples per second (sps). Without stopping the electrospinning deposition, the tool was manually moved through the deposition to a point outside of the deposition field then returned to the starting point of the scan (FIG. 8). The same trend of deflection observed in Example 2 was observed in Example 3 when sampling at 100 sps through Poly(ethylene oxide) (FIG. 8). When sampling with an ADC, filtering is needed. A 25th order median filter and a 5th order moving average filter are used to filter out outliers and discretizing errors.

The soot volume fraction date verified use of the tool of the subject invention to perform real-time dimensional analysis of electrospun fibers as they are being created. The laser diagnostics device of the subject invention obtains measurements in the electrospinner while fibers are being deposited through the changes in the measured intensity, changes in fiber morphology can also be tracked. By tracking fiber morphology throughout the electrospinning process, parameters to the process will be able to be changed allowing for real time control over fiber morphology.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:
1. An electrospinning apparatus comprising:
a spinneret driven by a high voltage power source;
a conductive collection plate having one side and another side, one side of the conductive collection plate spaced apart from the spinneret forming a deposition field between the spinneret and the conductive collection plate;
a linear stage disposed on the other side of the conductive collection plate out of the deposition field;
a laser/sensor assembly mounted on the linear stage;
a moving means engaging the linear stage to move the laser/sensor assembly across the deposition field; and
a control unit to collect signal voltages generated by the laser/sensor assembly.

2. The electrospinning apparatus of claim 1, wherein said linear stage comprises a first end, a second end, and rails therebetween.

3. The electrospinning apparatus of claim 1, wherein said moving means is a stepper motor.

4. The electrospinning apparatus of claim 1, wherein said moving means is manual manipulation.

5. The electrospinning apparatus of claim 1, wherein said control means comprises a microcontroller.

6. The electrospinning apparatus of claim 1, wherein said laser/sensor assembly comprises a laser emitting a wavelength of about 650 nanometers and a photodiode.

7. The electrospinning apparatus of claim 1, wherein said at least said linear stage, and said laser/sensor assembly are enclosed in the electrospinning apparatus.

8. A method of determining the diameter of a fiber being produced by electrospinning, the method comprising the steps of:
   a) transmitting a laser beam to a sensor while moving the beam through a deposition field of an electrospinning apparatus;
   b) collecting signal voltages from the laser as it moves across the deposition field;
   c) sectioning the collected signal voltages into concentric layers and calculating the extinction coefficient for each layer using Equation (1) where I is the intensity of the laser beam measured in watts, $I_0$ is the initial intensity of the laser, l is the distance that the laser travels through the sample, and K is extinction coefficient in units of per meter; and $$I = I_0 * e^{-K*l} \quad (1)$$

Where K calculated using Equation (2) where $K_i$ is the extinction coefficient through the $i^{th}$ layer of the sample and $l_{i,n}$ is distance through the sampled region of deposition:

$$K_i = \frac{-\ln\left(\frac{I_i}{I_0}\right) + 2 * \sum_{n=1}^{i-1} (K_n * l_{i,n})}{l_{i,i}} \quad (2)$$

d) determining fraction volume using Equations (3) and (4) $\overline{K}$ is the vector of extinction coefficients that were found using Equation 2, λ is the laser wavelength in meters, and v is the index of refraction $$\phi = \lambda * \overline{K} / 6\pi * E \quad (3)$$

$$E = -I\mathrm{mag}(v^2 - 1/v^2 + 2) \quad (4).$$

* * * * *